Figure 1:
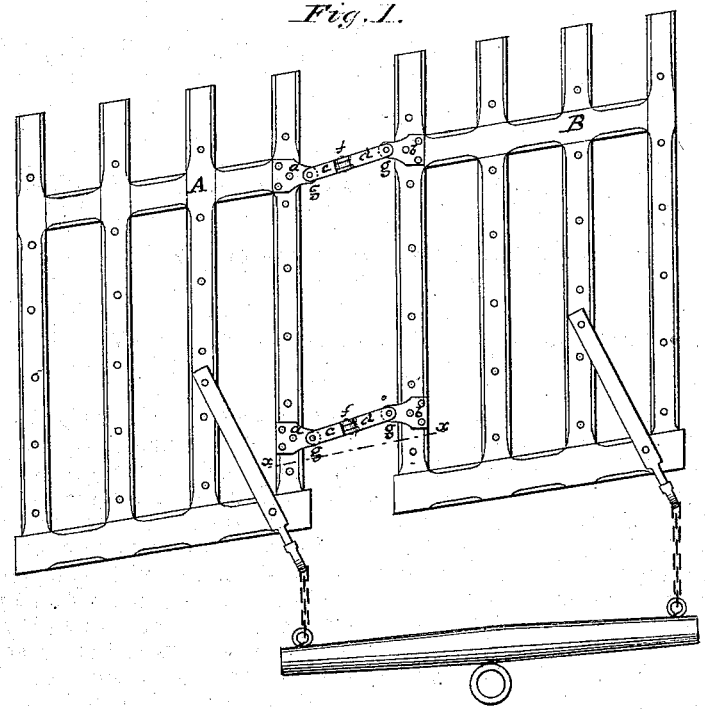
Figure 2:
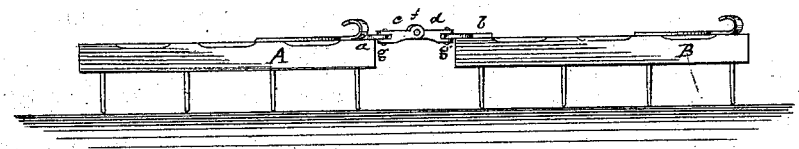
Figure 3:
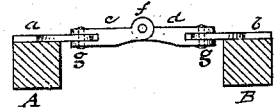

L. C. GIFFORD.
Harrows.

No. 136,717.                               Patented March 11, 1873.

Witnesses:
D. P. Owl
Alonzo Hughes

Inventor:
Leander C. Gifford
by his atty.
A. H. & R. K. Evans.

UNITED STATES PATENT OFFICE.

LEANDER C. GIFFORD, OF MONTICELLO, ILLINOIS.

IMPROVEMENT IN HARROWS.

Specification forming part of Letters Patent No. 136,717, dated March 11, 1873.

*To all whom it may concern:*

Be it known that I, LEANDER C. GIFFORD, of Monticello, Piatt county, and State of Illinois, have invented a new and useful Improvement in Harrows, of which the following is a full, clear, and exact description, reference being had to the accompanying drawing making a part of this specification, in which—

Figure I is the top view of a harrow with my improvement attached; Fig. II is a sectional view; and Fig. III is a side view of my improvement.

To enable others skilled in the art to make and use my invention, I will proceed to describe the manner in which I have carried it out.

It consists in the manner of coupling the harrows by means of a compound clevis-joint, by the use of which the harrows may be folded, or one laid on the top of the other, when desired; and when both are in use it allows either harrow to yield to obstructions, as shown and described.

The harrows A B are coupled by compound clevis-joints, as shown in Fig. I. The plates $c$ and $d$ are jointed at $f$, so as to allow a free vertical motion to the harrows and permit the one to be turned upon the other. These plates $c$ and $d$ are attached at $g$ to the plates $a$ $b$, which in turn are securely fastened to the harrows A B. The joint $g$ is constructed as shown in Figs. II and III, and secures to the harrows a free horizontal motion, by which they are allowed a lateral play to avoid damage when coming in contact with obstructions.

It will thus be evident that by my improvement harrows can be worked with more ease and convenience, and with greater facility, as either harrow can be readily lifted over stumps, stones, and other obstructions, without arresting the progress and work of the other, and while at work the harrows are self-adjusting to the character of the ground over which the work has to be done.

Having thus described my invention, what I claim as new is—

The compound clevis, consisting of the plates $a$, $b$, $c$, and $d$, constructed as described, in combination with the harrows A and B, substantially as and for the purpose set forth.

LEANDER C. GIFFORD.

Witnesses:
    DANIEL H. MILLER,
    HIRAM JACKSON.